July 24, 1962  R. A. CHENEY  3,046,048

MAGNETICALLY SECURED WINDSHIELD COVER

Filed Jan. 20, 1960

Roland A. Cheney
INVENTOR.

BY *Clarence A. O'Brien*
*and Harvey B. Jacobson*
Attorneys

United States Patent Office 3,046,048
Patented July 24, 1962

3,046,048
MAGNETICALLY SECURED WINDSHIELD COVER
Roland A. Cheney, 54 State St., Portland, Maine
Filed Jan. 20, 1960, Ser. No. 3,543
4 Claims. (Cl. 296—95)

This invention relates to a novel and useful windshield cover and more particularly to a windshield cover which is specifically adapted to be positioned in overlying relation to vehicle windshields and retained in overlying relation thereto by means of magnets secured to the lower edge of the cover and tensioning straps along the upper edges of the cover.

Many States are now enforcing laws, in an attempt to reduce highway accidents, which restrict a person from operating a vehicle having a partially obscured windshield. In many cases the vehicle owner is tempted to remove snow, ice or frost and the like only from the area of his windshield which is sufficient to give him vision forwardly of the vehicle while leaving the side portions of the windshield covered with ice, snow, frost and the like. Many drivers are in a hurry when they first use their vehicle each morning and because of their haste and need for a means for preventing the formation of frost and ice on their windshield they clear only a small area of their windshield. By leaving the side areas of the windshields obscured with ice and the like, a vehicle operator is taking a chance when he operates the vehicle inasmuch as his vision of the surrounding area about the vehicle is impaired. Many persons will place newspapers and the like over their windshield at night in an attempt to prevent the formation of ice on the outer surfaces of the windshield but wind and freezing rain can render newspaper almost entirely ineffective in preventing the formation of ice on a vehicle windshield.

Many forms of plastic sheets having means thereon for securing the sheets over the vehicle windshield have been marketed, but most of these have proven to be ineffective either because they were unable to conform to the contour of different windshields or because they were not equipped with adequate means for retaining the covers in position in over-lying relation to the windshields.

It is therefore the main object of this invention to provide a windshield cover which may be secured over the windshield of a vehicle without permanently securing any fasteners to the vehicle and without marring the finish of the vehicle.

A further object of this invention, in accordance with the preceding object, is to provide a means for securing the upper edge of a windshield cover in overlying relation to the top of the vehicle adjacent the windshield thereof in a tensioned state so that wind will be ineffective to remove the cover from the windshield and rain and the like will be restricted from passing between the cover and the top of the vehicle to run down over the windshield under the cover.

A further object of this invention, in accordance with the preceding objects, is to provide the lower edge of the cover with magnets secured in a seam formed along the lower edge of the cover so that they may magnetically secure the lower edge of the cover to the metallic surfaces of the vehicle immediately adjacent the lower edge of the windshield without marring those metallic surfaces.

A final object to be specifically enumerated herein is to provide a device that will conform to conventional forms of manufacture, be easy to apply to the windshield of a vehicle and conform readily to various shapes of windshields so as to provide a device that will be economically feasible, easy to use and readily adaptable to windshields of various makes of vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
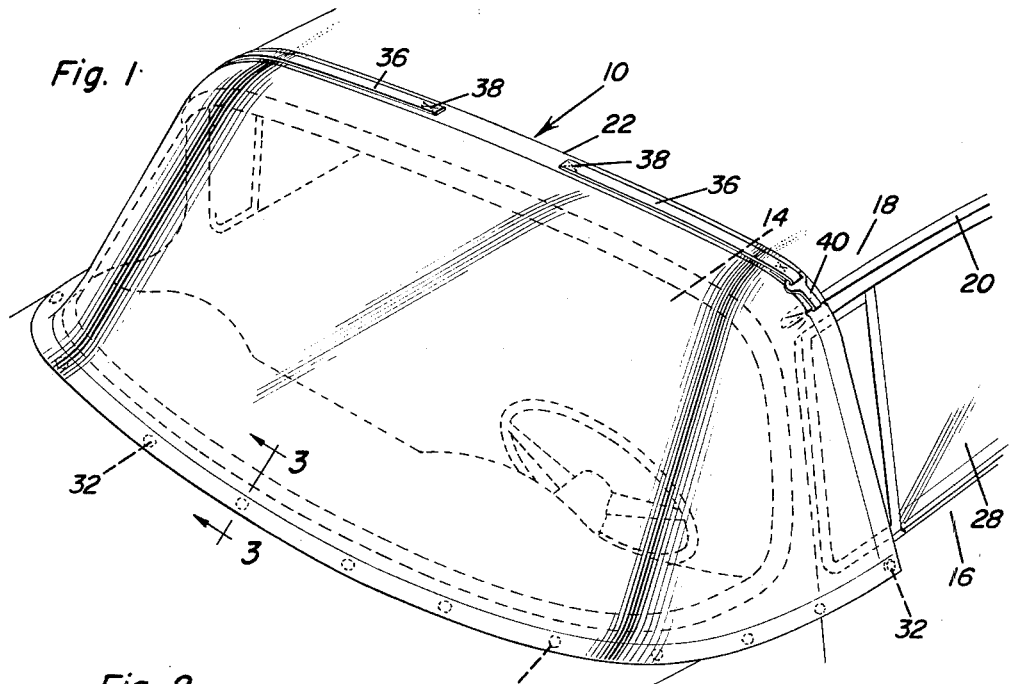
FIGURE 1 is a perspective view of the protective windshield cover mounted in overlying relation to the windshield of a vehicle, the windshield and parts of the interior of the vehicle being shown in phantom lines.
Figure 2:
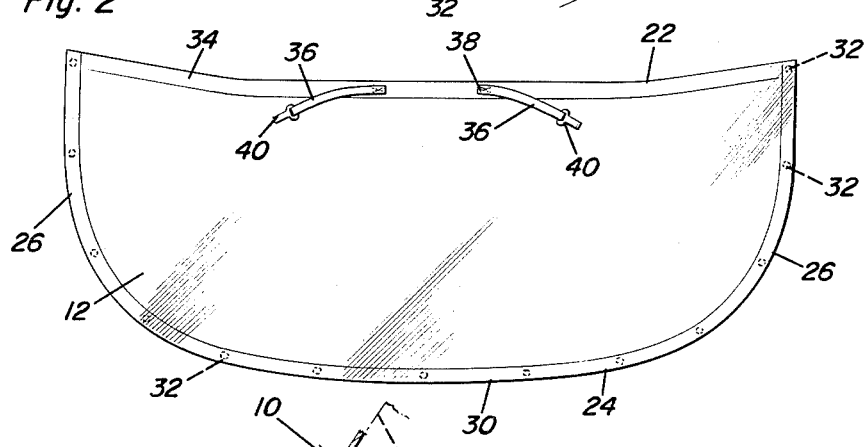
FIGURE 2 is a top plan view of the windshield cover on somewhat of a reduced scale.
Figure 3:
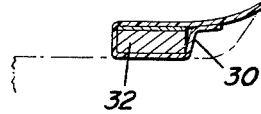
FIGURE 3 is a vertical sectional view somewhat on an enlarged scale taken substantially upon a plane indicated by the section line 3—3 of FIGURE 1.

Referring now more specifically to the drawings the numeral 10 generally designates the windshield cover comprising the present invention which includes a sheet of plastic material 12 which is shaped to conform to the general outline of the windshield 14 of the vehicle 16.

The vehicle 16 includes a roof 18 which has extending longitudinally along the opposite side thereof a pair of rain gutters 20. The rain gutters 20 extend to a point closely adjacent the upper edge of the windshield 14 and the cover 10 is adapted to overlie at least the forward portions of the gutters 20.

The sheet 12 is provided with a relatively straight upper edge 22 and a curved lower edge 24 whose end portions 26 are in the form of a gradual curve terminating at opposite ends of the top edge 22.

It will be noted from FIGURE 1 of the drawings that the top edge 22 of the sheet 12 overlies that portion of the top 18 which is positioned immediately to the rear of the windshield 14 and that the top edge 22 overlies the forward portions of the rain gutters 20 to extend downwardly over the forward portions of the front side windows 28 of the vehicle 16. The lower edge 24 of the sheet 12 is provided with a hem 30 which may be formed in any convenient manner and has disposed therein longitudinally spaced magnets 32. The magnets 32 are completely housed within the hem 30 so as to provide at least one thickness of the sheet 12 between the magnets 32 and the adjacent surfaces of the vehicle 18. The hem 30 extends across the vehicle 18 below the lower edge of the windshield 14 and magnetically secures that edge of the sheet 12 to the vehicle 16. If it is desired, the upper edge 22 of the sheet 12 may also be provided with a hem 34 to provide additional strength.

A pair of elastic straps 36 extend along the hem 34 and are spaced from each other. The adjacent ends of the straps 36 are secured to the hem 34 by any convenient means such as stitching 38 and the free ends of the straps 36 are provided with rigid U-shaped strap hooks 40 which are adapted to embrace the undersurface of the forward portions of the rain gutters.

It is to be noted that the plastic material from which the sheet 12 is constructed is to be provided with inherent elasticity enabling the sheet 12 to conform substantially in contour to windshields having compound curves while the sheet 12 is tensioned.

In operation, the top edge 22 of the sheet 12 is placed in overlying relation to that portion of the top 18 of a vehicle 16 immediately to the rear of the upper edge of the windshield 14. One of the hooks 40 is then engaged with the undersurfaces of the adjacent rain gutter 20 with the hem 34 being disposed between the confronting surfaces of the hook 40 and the rain gutter 20. The person applying the cover 10 then proceeds to the other side of the vehicle 16 and tensions the sheet 12 over that side of the automobile after which the adjacent elastic strap 36 is tensioned and the hook 40 on the free end thereof is engaged with the undersurfaces of the adjacent rain gutter 20 in the same manner that the other hook 40 was engaged with the rain gutter 20 on the other side of the vehicle 16. After the top edge 22 has been secured to the vehicle 16, the lower edge 24 may be properly positioned so that the magnets 32 magnetically secure that edge of the sheet 12 to the metallic surfaces of the vehicle 16 adjacent the lower edge of the windshield 14.

In this manner, the lower edge of the cover 10 is magnetically secured to the vehicle 16 without the magnets 32 coming in direct contact with the finish of the vehicle 16 and the upper edge 22 of the sheet 12 is secured by means of strap hooks with the upper edge of the sheet tensioned to exclude the entrance of water beneath the cover 10 by entering under the upper edge 22 thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle having a windshield and a roof structure with longitudinally extending rain gutters extending along opposite sides of the roof, an automotive windshield cover for protecting said windshield comprising a flexible sheet of plastic, said sheet overlying and extending beyond the peripheral edges of said windshield, magnetic means carried by the lower edge of said sheet magnetically securing the lower edge of said sheet to metallic surfaces of said vehicle adjacent the lower edge of said windshield, the upper edge of said sheet overlying at least the forward ends of said rain gutters, a pair of fully exposed spaced elastic straps extending along and over the upper edge of said sheet with their adjacent ends secured to the outer side of said sheet along the portion thereof overlying said roof, a rigid strap hook secured to the free end of each of said straps with said straps being tensioned and said hooks each engaged beneath the adjacent rain gutters with the portions of said sheet adjacent said gutters being disposed and frictionally retained between said gutters and said strap hooks whereby said elastic straps will tension said sheet over the portion of said top disposed therebetween and retain the upper edge of said sheet in position in overlying relation to said windshield.

2. The combination of claim 1 wherein said magnetic means is secured to said sheet in a manner to provide at least one thickness of said sheet between said magnetic means and said vehicle.

3. The combination of claim 1 including a hem formed in said sheet along the lower edge thereof, said magnetic means comprising a plurality of spaced magnets disposed in said hem.

4. The combination of claim 1 wherein said sheet of plastic has inherent elasticity enabling it to conform substantially in contour to windshields having compound curves while under tension.

References Cited in the file of this patent

UNITED STATES PATENTS

| | | |
|---|---|---|
| 2,437,845 | Wyeth | Mar. 16, 1948 |
| 2,614,630 | Moszelt | Oct. 21, 1952 |
| 2,639,751 | Flaherty | May 26, 1953 |
| 2,649,330 | Schamel et al. | Aug. 18, 1953 |
| 2,907,384 | Spratt et al. | Oct. 6, 1959 |